US011915102B2

(12) United States Patent
Ghibaudi

(10) Patent No.: US 11,915,102 B2
(45) Date of Patent: Feb. 27, 2024

(54) QUANTUM COMPUTING APPARATUS AND ASSOCIATED METHODS

(71) Applicant: River Lane Research Ltd., Cambridge (GB)

(72) Inventor: Marco Ghibaudi, Cambridge (GB)

(73) Assignee: RIVERLANE LTD, Cambridge (GB)

( * ) Notice: Subject to any disclaimer, the term of this patent is extended or adjusted under 35 U.S.C. 154(b) by 150 days.

(21) Appl. No.: 17/657,306

(22) Filed: Mar. 30, 2022

(65) Prior Publication Data

US 2023/0316118 A1 Oct. 5, 2023

(51) Int. Cl.
*G06N 10/20* (2022.01)
*G06N 10/40* (2022.01)
*G06F 13/16* (2006.01)

(52) U.S. Cl.
CPC .......... *G06N 10/20* (2022.01); *G06F 13/161* (2013.01); *G06N 10/40* (2022.01)

(58) Field of Classification Search
CPC ....... G04N 10/20; G04N 10/40; G06F 13/161
See application file for complete search history.

(56) References Cited

U.S. PATENT DOCUMENTS

| 10,127,499 | B1* | 11/2018 | Rigetti | G06N 10/00 |
| 10,817,463 | B1* | 10/2020 | DeBenedictis | G06N 10/00 |
| 11,194,573 | B1 | 12/2021 | Smith | |
| 2018/0013426 | A1* | 1/2018 | Deurloo | G06N 10/00 |
| 2018/0123597 | A1* | 5/2018 | Sete | H03K 19/195 |
| 2018/0260730 | A1* | 9/2018 | Reagor | H03K 19/195 |
| 2018/0308007 | A1* | 10/2018 | Amin | G06N 3/047 |
| 2018/0322409 | A1* | 11/2018 | Barends | G06F 17/16 |
| 2019/0049495 | A1* | 2/2019 | Ofek | G06F 9/5027 |

OTHER PUBLICATIONS

International Search Report for International Application No. PCT/GB2023/050801 dated Jun. 19, 2023.
Jokar et al. "DigiQ: A scalable digital controller for quantum computers using SFQ logic." 2022 IEEE International Symposium on High-Performance Computer Architecture (HPCA). IEEE, Feb. 3, 2022.

* cited by examiner

*Primary Examiner* — Henry Tsai
*Assistant Examiner* — Christopher A Daley
(74) *Attorney, Agent, or Firm* — MASCHOFF BRENNAN

(57) ABSTRACT

An apparatus for a quantum computer comprising a memory device and a converter block, the memory device comprising: a local command module; and a double-buffer-memory module comprising a plurality of pairs of memory modules, each memory module: coupled to the local command module; and configured to store a respective operation for controlling a qubit of the quantum computer; wherein the local command module is configured to: receive an instruction to provide the operation for the qubit; read the operation from a respective one of the plurality of pairs of memory modules indicated by the instruction; and provide the operation to the converter block; wherein the converter block is configured to receive the operation from the memory device and provide digital output pulses, representative of the operation, to an output interface, the output interface configured to provide the digital output pulses to a digital-to-analogue converter for controlling the qubit to perform the operation.

16 Claims, 4 Drawing Sheets

QUANTUM COMPUTING APPARATUS AND ASSOCIATED METHODS

BACKGROUND

The present disclosure relates to apparatus, systems and methods for generating pulses suitable for controlling a qubit, of a quantum computer, to perform an operation corresponding to one or more quantum logic gates.

SUMMARY OF EXAMPLE EMBODIMENTS

According to a first example embodiment, there is provided an apparatus for a quantum computer. The apparatus comprises: a memory device and a converter block, the memory device comprising: a local command module; and a double-buffer-memory module comprising a plurality of pairs of memory modules. Each memory module: coupled to the local command module; and configured to store a respective operation for controlling a qubit of the quantum computer. The local command module is configured to: receive an instruction to provide the operation for the qubit; read the operation from a respective one of the plurality of pairs of memory modules indicated by the instruction; provide the operation to the converter block. The converter block is configured to receive the operation from the memory device and provide digital output pulses, representative of the operation, to an output interface, the output interface configured to provide the digital output pulses to a digital-to-analogue converter for controlling the qubit to perform the operation.

Optionally, each pair of memory modules of the plurality of pairs of memory modules may comprise a first memory module with an active status and a second memory module with an idle status and the operation may be read from the first memory module of the respective pair of memory modules.

Optionally, the operation may comprise a quantum logic gate with fixed arguments.

Optionally, the memory device may comprise a local update module configured to: receive a command to update a respective one of the plurality of pairs of memory modules, the command may comprise an updated operation for controlling the qubit, the respective one of the plurality of pairs of memory modules may comprise a first memory module with an active status and a second memory module with an idle status; write the updated operation to the second memory module.

Optionally, the local update module may be configured to switch the second memory module to active status and the first memory module to idle status.

Optionally, the apparatus may comprise a plurality of memory devices including the memory device and a plurality of converter blocks including the converter block, wherein each memory device may be: coupled to a respective one of the plurality of converter blocks; configured to provide a respective operation to the respective converter block.

Optionally, each respective converter block, may comprise a respective output interface and each respective converter block may be configured to provide respective digital output pulses, representative of the respective operation, to the respective output interface, the respective output interface may be configured to provide the respective digital output pulses to a respective digital-to-analogue converter for controlling a respective qubit, of the quantum computer, to perform the respective operation.

Optionally, the apparatus may comprise a global command module, connected to each memory device, and configured to: receive a request to perform a respective operation on a respective qubit; identify a particular memory device and particular converter block configured to provide operations to the respective qubit; provide an instruction to the particular memory device to access a particular memory module containing the respective operation and provide the respective operation to the particular converter block to control the respective qubit to perform the respective operation.

Optionally, the apparatus may comprise a global update module, connected to each memory device, and configured to: receive a request to perform an update operation on a particular memory module of a particular memory device; provide a command to the particular memory device to update the particular memory module using the update operation.

Optionally, the global update module may be configured to receive signalling from the particular memory device that the update is complete and provide confirmation signalling to control the particular memory device to switch an idle status of the particular memory module to an active status and to switch an active status of a memory module paired with the particular memory module to an idle status.

Optionally, the apparatus may further comprise a plurality of digital-to-analogue converters and a corresponding plurality of qubits, each qubit connected to a respective digital-to-analogue converter and each digital-to-analogue converter connected to a respective one of the output interfaces of the plurality of converter blocks.

Optionally, a quantum computer may comprise the apparatus.

According to yet another example, there is provided a computer-implemented method comprising: receiving a request to perform a respective operation on a respective qubit of a quantum computer; identifying a particular memory device and a particular converter block configured to provide operations to the respective qubit; providing an instruction to the particular memory device to access a particular memory module containing the respective operation and providing the respective operation to the particular converter block to control the respective qubit to perform the respective operation by providing respective digital output pulses representative of the respective operation to a digital-to-analogue converter; receiving a request to perform an update operation on a particular memory module of a particular memory device; providing a command to the particular memory device to update the particular memory module using the update operation; and receiving signalling from the particular memory device that the update is complete and providing confirmation signalling to control the particular memory device to switch an idle status of the particular memory module to an active status and to switch an active status of a memory module paired with the particular memory module to an idle status.

Optionally, both the respective operation and the update operation may be selected from a set of no more than sixteen different operations.

According to another embodiment, there is provided a computer program product comprising instructions configured to perform the method of any disclosure herein on a quantum computer.

BRIEF DESCRIPTION OF THE DRAWINGS

Examples of the present invention will now be described in detail with reference to the accompanying drawings, in which.

DETAILED DESCRIPTION

Figure 1:
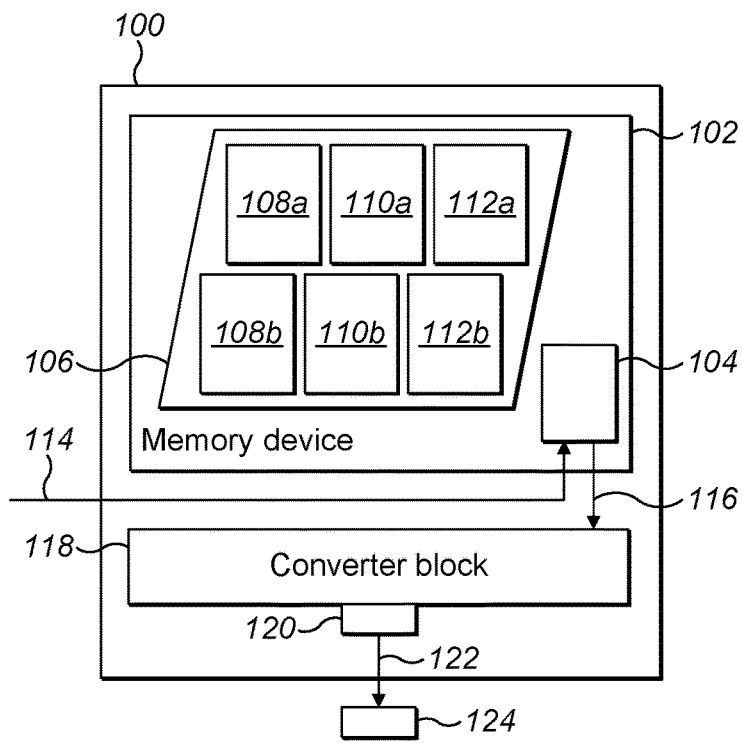
FIG. 1 shows an example embodiment of an integrated memory device and converter designed to provide digital output pulses to drive a digital-to-analogue converter capable of controlling a qubit to perform an operation.

Quantum computers are among the most difficult and demanding types of apparatus to construct and operate. In the NISQ era (noisy intermediate-size quantum devices) a key problem is how to reduce latency in controlling the qubits that perform the quantum information processing, to control, correct, or reduce the adverse effects of noise on quantum computation. An important source of latency in existing quantum computers is the presence of Field Programmable Gate Arrays (FPGA) in the control architecture of the quantum computer. Methods and apparatus that remove the need for FPGA's in quantum computers would both improve latency and reduce the resource cost of constructing quantum computers as FPGA's are complex and expensive components. The present disclosure provides a way to eliminate the need for FPGA's from quantum computers irrespective of the hardware used to implement the quantum computer's qubits.

The following introduces some terminology and abbreviations used in this disclosure.

Quantum Computer (QC): a machine that uses the properties of quantum physics to perform computation.

Quantum Gates (GATES): elementary operations that modify the internal quantum state of qubit. They can be configured to have different behaviours via arguments.

Low-level control pulses (PULSES): electrical signals characterized by variable amplitude, frequency spectrum and temporal duration. Used to control directly or indirectly (e.g., via lasers) the qubits.

Quantum Operations (OPERATIONS): a specific instance of a quantum GATE in which all the arguments are fixed.

Quantum Processing Unit (QPU): the portion of a Quantum Computer that directly interacts with the Qubit.

Quantum Error Correction (QEC): a set of quantum and classical operations that combined significantly reduce the error probability of the quantum operations.

Gateset, the set of quantum gates that a specific system implements and exposes to the users.

High Bandwidth Memory (HBM) typically a stacked series of DRAM chips that expose many pins to support e.g., >100 GBs data bandwidth.

CNOT(qubit0, qubit1): a type of dual qubit quantum gate used to generate Quantum entanglement.

X( ), I( ), Z( ), RX( ), RZ( ): a type of single qubit quantum gate used to transform the quantum state along different axis of the Bloch sphere.

MEASUREMENT( ): the quantum operation that forces the quantum state to map into a classical (measurable) value ACTIVE RESET( ): the operation that resets the state of a qubit to a well-known value.

A key element of a Quantum Computer is the generation of low-level control sequences that are used, directly or indirectly, to control the qubits of the Quantum Computer to perform computations. Computation is performed using quantum circuits that are analogous mathematically to the classical logic gates used in classical computing. Quantum circuits are composed of combinations of elementary units called quantum gates (GATES). The set of gates that a quantum computer supports is known as the GATESET and it is a fixed property of each particular quantum computer. Most of the GATES have arguments that modify their behaviour, e.g., the phase of a rotation in a RX gate. They also have qubit index information attached to them to refer to the specific qubit to be manipulated, since Quantum Computers comprise a plurality of qubits.

In this disclosure the word OPERATION is used to indicate a specific instance of a generic GATE, that is made specific because the arguments are fixed; e.g. RX(1, pi/2) in which a rotation over the X axis of pi/2 radians is applied to the qubit with index 1.

In practice, Quantum gates are physically implemented as a sequence of low-level electrical signals (PULSES) characterised by amplitude, phase, and duration properties. These amplitude, phase, and duration properties for each PULSE depend on:

a) The qubit that is addressed.
b) The quantum gate to be executed.
c) The outcome of a set of periodic calibration routines.

Here, (a) and (b) are intrinsic properties of the system and (c) is considered stable for minutes/hours depending on the details of the hardware.

The PULSE generation process is conventionally achieved using FPGA devices that either:

a) Playback from an external memory (such as DRAM [Dynamic random-access memory]) a set of predefined electrical sequences and streams the values to multiple Digital to Analog Converters (DAC)

b) Read from an external memory (e.g., DRAM) or interface (Ethernet) a compressed representation of the pulses and then expands them on the fly before streaming to multiple DACs.

Due to the physically sensitive nature of qubits, quantum computations are extremely error prone. Quantum Error Correction (QEC) can be used to detect errors and generate corrective action, enabling the possibility of useful applications of quantum computers. QEC can be implemented using a small set of GATES with a limited number of arguments. Advantageously, this leads to a small set of OPERATIONs. However, QEC imposes an overhead in terms of the number of qubits that are required to implement an operation. The magnitude of this overhead is proportional to the latency associated with generating PULSES. Hence, it is useful to reduce the latency where possible.

A significant problem with conventional Quantum Computer is the presence of FPGAs which inevitably cause unwanted latency, cost and complexity. Typically, modern FPGA do not have enough internal memory to remove the need for external memory devices (e.g., Megabytes vs Gigabytes required). Fetching the PULSEs from an external Memory introduces additional latency that further increases the QEC overhead. For large scale systems, for example more than 100 qubits, the total cost of the FPGA chips becomes a significant part of the total cost and complexity of the Quantum Computer's electronics. Problematically, this acts to slow down the adoption of large-scale quantum solutions.

The present disclosure provides solutions to the above problems by integrating high-speed converter interfaces into High Bandwidth Memory architectures. This can provide an integrated solution to the problems of the high latency caused by FPGAs and the prohibitive cost and/or complexity arising from FPGA-based systems.

FIG. 1 shows an integrated memory device and converter 100 suitable for a quantum computer. The memory device 102 includes a local command module 104 and a double-buffer-memory module 106. The memory device 102 is an example of a qubit memory pool or qubit memory region that serves a corresponding qubit. The double-buffer-memory module 106 has a plurality of pairs of memory modules or pages (of which three pairs 108a/108b 110a/110b 112a/112b are shown here, although it will be appreciated that the plurality may comprise any number of pairs). Pairs of pages can be referred to as Upper 108a 110a 112a and Lower 108b 110b 112b pages Each memory module 108a 108b 110a 110b 112a 112b is independently coupled to the local command module 104. Further, each individual memory module 108a 108b 110a 110b 112a 112b and can store its own operation for controlling a qubit of a quantum computer.

The local command module 104 can receive an instruction 114 to provide the operation for the qubit by reading the operation from a designated one of the plurality of pairs of memory modules 108a/108b 110a/110b 112a/112b indicated by the instruction and provide that operation via a signal 116 to a converter block 118.

The converter block 118 can receive the operation in the form of the signal 116 from the memory device 102 and provide digital output pulses 122 that are representative of the operation (in that they provide information that represents the operation is any coded fashion) to an output interface 120. The digital output pulses 122 are provided to a digital-to-analogue converter (DAC) 124 for controlling the qubit to perform the operation. The particular type of DAC 124 will vary depending on the particular type of qubit to be controlled, but the schematic structure of the integrated memory device and converter 100 can be the same for any DAC and qubit type.

Within the double-buffer-memory module 106 each pair of memory modules has a first memory module 108a 110a 112a that has an active status, which means that it can be accessed by the local command module 104 to read the operation stored in the relevant one of the (active) first memory modules 108a 110a 112a. The operation stored on any of the memory modules can correspond to a quantum logic gate, with fixed arguments, specific to that memory module, such that different memory modules may store different operations.

The other memory module of each pair 108b 110b 112b has an idle status, which means that it cannot be read by the local command module 104. The status of any pair of memory modules can be swapped, such that a previously active memory module becomes idle while the previously idle module becomes active.

Figure 2:
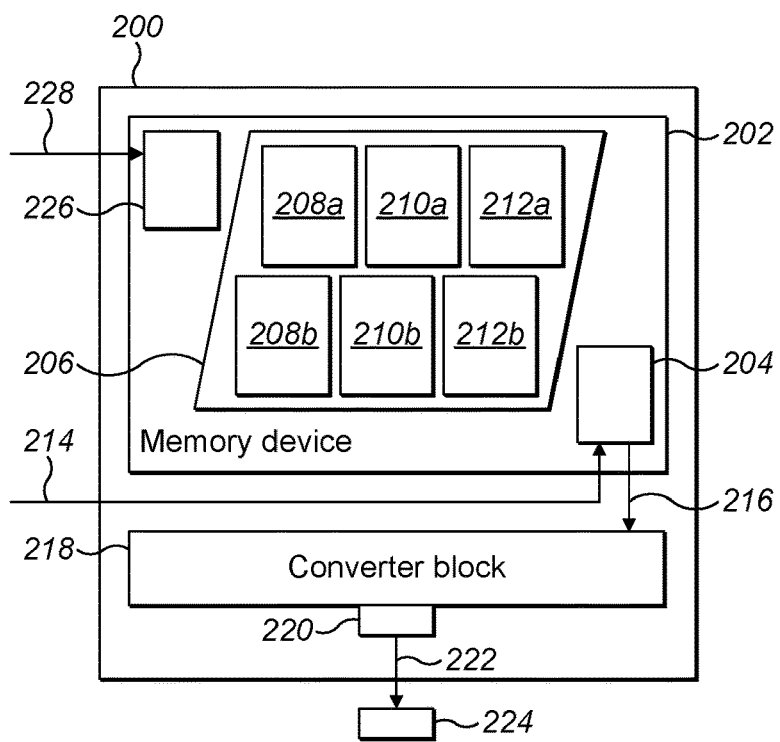
FIG. 2 shows an example embodiment of an integrated memory device and converter, similar to that of FIG. 1, with a module for updating the memory device.

FIG. 2 shows an integrated memory device and converter 200 similar to that of FIG. 1. Similar features to those of FIG. 1 have been given similar reference numerals and may not necessarily be discussed here to improve the clarity of the disclosure.

The integrated memory device and converter 200 has a memory device 202 with a local update module 226. The local update module 226 can receive a command 228 to update any one of the pairs of memory modules 208a/208b 210a/210b 212a/212b. The command 228 includes an updated operation, for controlling a qubit, to be stored in one of the pairs of memory modules such as the first pair 208a/208b. The first pair 208a/208b includes a first memory module 208a with an active status and a second memory module 208b with an idle status. Since the second memory module 208b has the idle status the update operation can be written into it. The local update module 226 can then switch the status of the second memory module 208b to active and the status of the first memory module 208a to idle. In this way, the newly stored updated operation in the second memory module 208b is made available to the local command module 204, when required.

Figure 3:
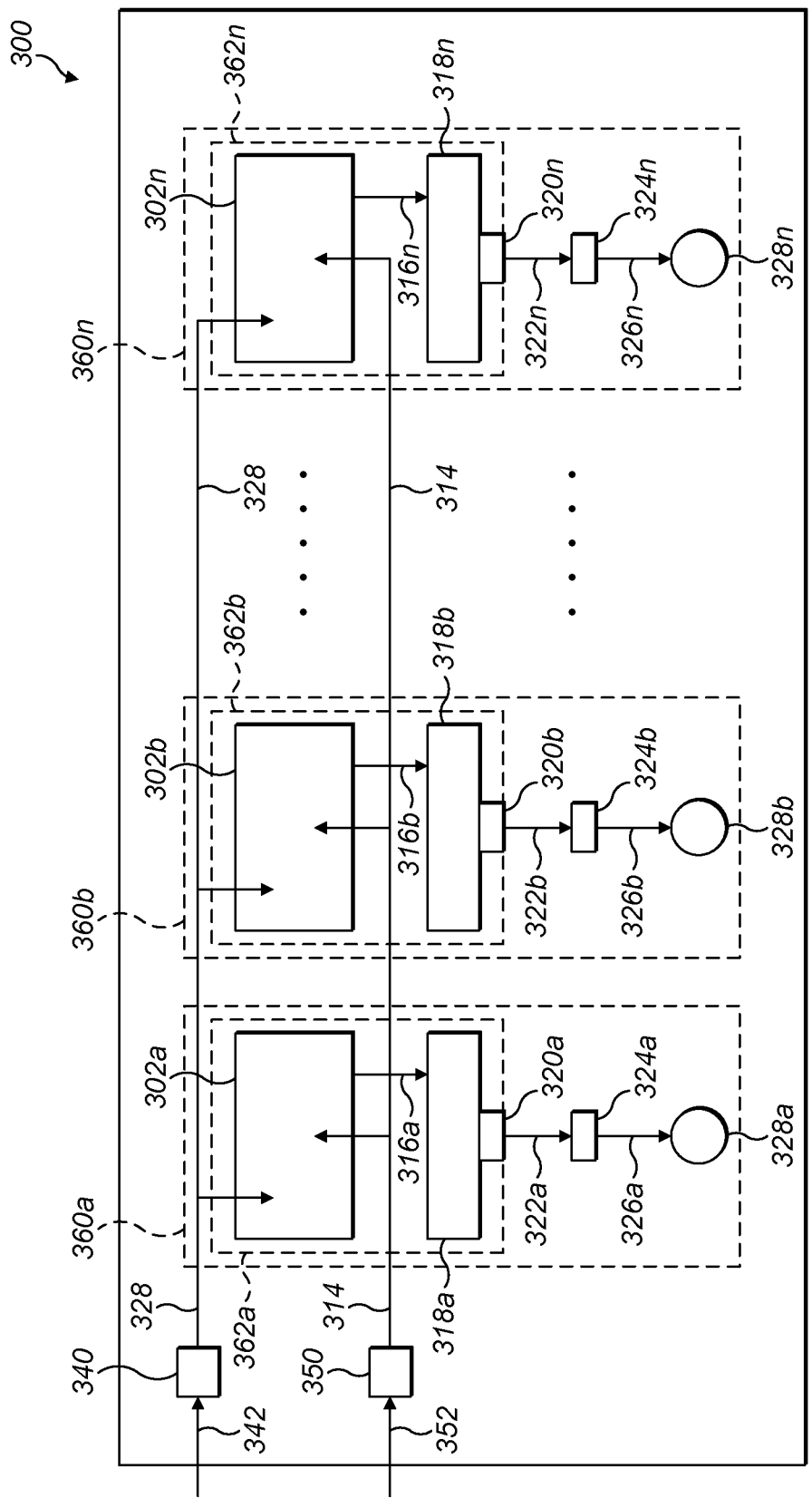
FIG. 3 shows an example embodiment of a quantum computer based on multiple integrated memory devices and converters designed to control multiple qubits.

FIG. 3 shows a Quantum Computer 300. Quantum Computers generally have a plurality of qubits, but for clarity, in this example only three with their associated hardware are illustrated. However, it will be appreciated that the actual number of qubits and associated hardware, according to embodiments of the present disclosure, may be of any number. Similar features in FIG. 3 have been given similar reference numerals.

Qubit 328a is part of a qubit-signal-chain 360a. The qubit signal chain 360a has an integrated memory device and converter 362a similar to that of FIG. 2, where similar reference numerals have been used for corresponding features (some of the detailed features shown in FIG. 2 have been omitted from illustration of FIG. 3 for clarity, but it will be appreciated that such features are present in the integrated memory device and converter 362a). The integrated memory device and converter 362a provides digital output pulses 322a to a DAC 324a which in turn provides signalling 326a that controls the qubit 328a to perform an operation supplied from the memory device 302a.

The Quantum Computer 300 has a further plurality of qubit signal chains 360b . . . 360n, each controlling a respective qubit 328b . . . 328n by means of respective integrated memory device and converter modules 362b . . . 362n. The properties, structure and function of each of the qubit signal chains 360a, 360b . . . 360n correspond to each other.

The memory device 302a 302b 302n of each integrated memory device and converter 362a 362b 362n is connected to a global update module 340. The global update module is an example of a Global Config Engine. The global update module 340 receives a request 342 (which is an example of a CONFIG message) to perform an update operation of a particular memory module or page of a particular memory device (which could be any one of the memory devices 302a 302b 302n). The request indicates the page/memory module that needs updating and the corresponding PULSE definition. The global update module 340 provides a command 328 (which is also an example of a CONFIG message) to perform the relevant update operation, to the local update module of the relevant memory device.

The relevant local update module then performs three tasks. First, it identifies the memory module/page that is idle. Second, it updates the idle memory module/page with the provided PULSE definition. Third, when the update operation is complete the local update module sends signalling to the global update module 340 that the update is complete. The global update module 340 then provides confirmation signalling to the relevant local update module to switch the idle and active memory module/page status.

The memory device 302a 302b 302n of each integrated memory device and converter 362a 362b 362n is connected to a global command module 350. The global command module 350 is an example of a Global Command Engine. The global command module 350 can receive a request 352 (or a batch of requests) to execute the next gate, or operation, from an external device. Each request 352 can be in a format that identifies the relevant qubit using a 'Qubit index' and the relevant memory module using a 'Page number' (e.g., Qubit0, Page-3). The request 352 is forwarded to the Local Command module that handles the corresponding memory device or qubit Memory Pool (e.g., Qubit0—Local Command Engine). Each local command module selects the next PULSES to be executed from the memory device/Qubit Memory Pool. The double buffer mechanism is in place, so each INSTRUCTION has an active and idle version contained in Upper and Lower Pages. PULSES are only fetchable/readable from active pages. Each memory device 302a 302b 302n is directly connected to a High-speed converter block. This enables each High-Speed converter block 318a, 318b 318c to transmits the required PULSEs to the Digital to Analog Converters 324a 324b 324n for onward provision to the qubits 328a 328b 328n to undertake the required quantum operations as part of a quantum computation. In this way, very low latencies can be achieved in providing the control signalling required to control the qubits 328a 328b . . . 328n, which advantageously improves the performance of the Quantum Computer 300.

Figure 4:
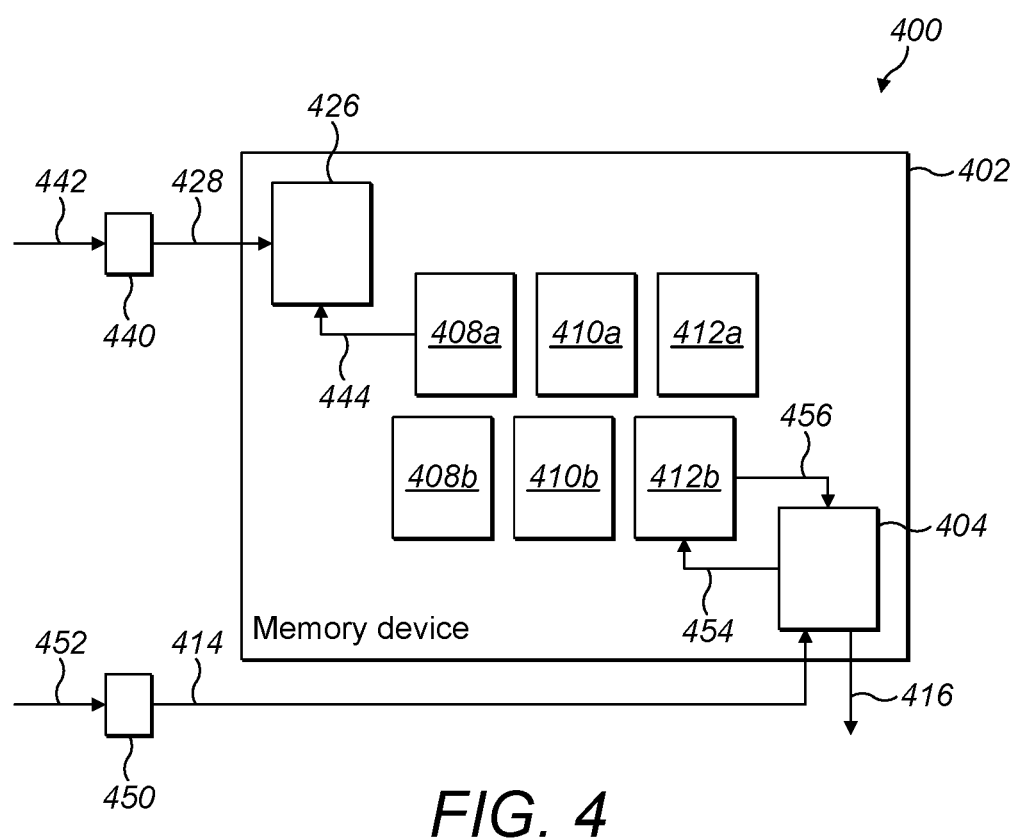
FIG. 4 shows an example embodiment of a memory device, and associated signalling, capable of performing memory updates and generating pulses in parallel.

FIG. 4 shows a close-up of a memory device and associated signalling 400. The memory device 402 is similar to those included in each qubit signal chain of the Quantum Computer of FIG. 3. The memory device 402 can perform simultaneous updating of memory modules and generation of pulses.

A global update module 440 receives a request 442 to update a memory module 408a. The global update module 440 provides a command 428 to a local update module 426 which in response generates an update operation signal 444 to update the operation stored in the idle memory module 408a. Simultaneously or in parallel, a global command module 450 receives a request 452 for an operation stored in an active memory module 412b. The global command module 450 sends an instruction 414 to provide the operation to the local command module 404. The local command module 404 provides a read operation signal 454 to the active memory module 412b which returns a fetched operation signal 456 representative of the operation stored in the active memory module 412b to the local command module 404. The local command module can then provide the operation signal 416.

The updating and pulse/operation generation processes can occur independently. Therefore, with appropriate timing, it is possible to ensure that the local command module 404 can access the relevant pulses/operation to provide a very low latency supply of the information needed to enable efficient qubit operation/manipulation for the purpose of quantum computing.

Figure 5:
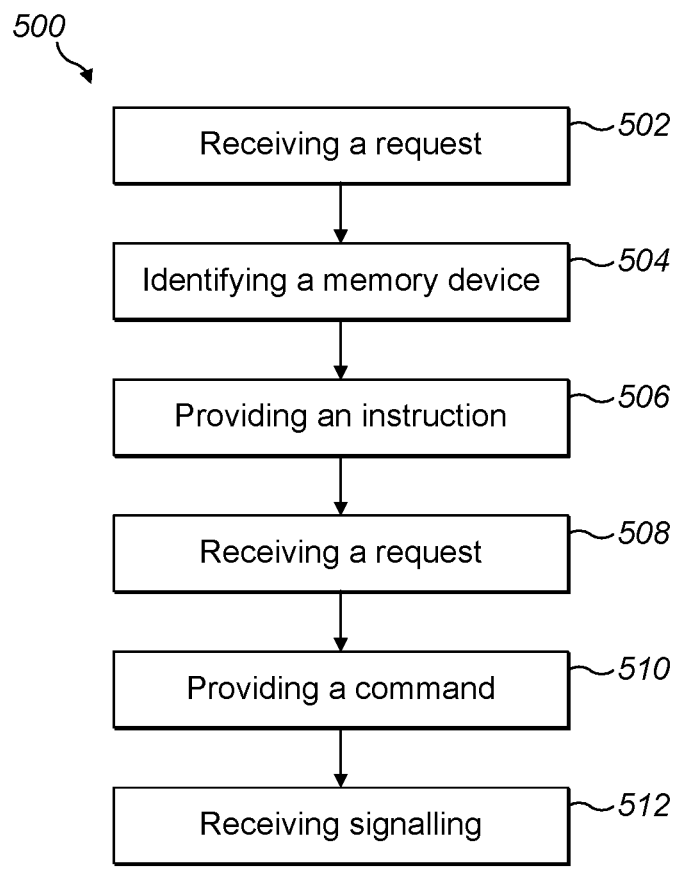
FIG. 5 shows an example embodiment of a method for generating pulses for controlling a qubit and updating a memory in parallel.

FIG. 5 shows a method 500 for generating pulses for controlling a qubit and updating a memory in parallel.

The method 500 begins at a first step 502 with receiving a request to perform an operation on a qubit of a quantum computer.

At a second step 504, the method 500 includes identifying a memory device and a corresponding converter block configured to provide operations to the qubit.

At a third step 506, the method 500 includes providing an instruction to the memory device to access a specific memory module containing the operation and providing the operation to the corresponding converter block to control the qubit to perform the operation by providing digital output pulses representative of the operation to a digital-to-analogue converter.

At a fourth step 508, the method 500 includes receiving a request to perform an update operation on a particular memory module of a memory device.

At a fifth step 510, the method 500 includes providing a command to the particular memory device to update the particular memory module using the update operation.

At a sixth step 512, the method 500 includes receiving signalling from the memory device that the update is complete and providing confirmation signalling to control the memory device to switch an idle status of the memory module to an active status and to switch an active status of a memory module paired with the particular memory module to an idle status.

The first 502, second 504, and third 506 steps can be performed before, after, or at the same time at the fourth 508, fifth 510 and sixth 512 steps. Thus, the pulses can be produced in parallel with the updating procedure. Provided the memory module is updated in due time, the pulses can be produced with very low latency since the relevant operation can thereby always be available.

In some examples of the method 500, both the operation and the update operation can be selected from a set of no more than sixteen different operations. This reduced set of operations may enable the efficient performance of Quantum Error Correction, especially in the context of the present low latency methods and apparatus.

Figure 6:
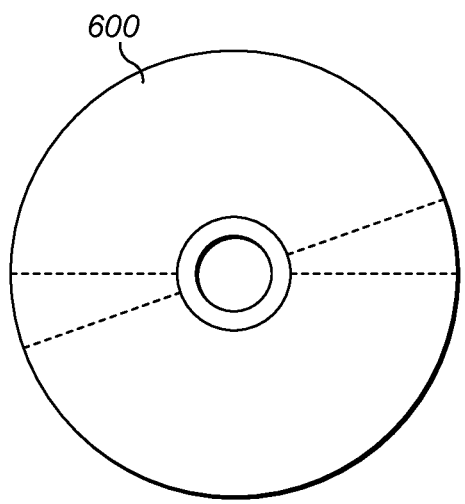
FIG. 6 shows an example embodiment of a computer program product.

FIG. 6 shows an example computer program product 600 that contains instructions which, when executed, cause an apparatus, as described in FIG. 3, to at least perform steps of the method described above in relation to FIG. 5. Equivalently, there may also be provide a computer readable memory medium corresponding to the computer program product 600.

Effects of the systems presented in the present disclosure include reductions in latency and total resource cost for quantum computers, irrespective of the physical hardware used to implement the qubits. This is possible because FPGAs account for a large part of the resource cost of the quantum control stack, while they introduce a data readout latency that adversely affects the performance and size of the quantum computer.

The present disclosure provides a way to remove the FPGA components from a Quantum Computer, without adversely effecting other aspects of quantum computing performance, thereby providing substantial cost, complexity, and latency reductions.

APPENDIX

Creation of an integrated Memory to High-speed converter data path.
  A High Bandwidth Memory (HBM) device can be integrated with High-speed converter interfaces to reduce the total latency to generate PULSEs.
  QEC can be implemented with less than 16 INSTRUCTIONs. For different types of Quantum Computers, the number of INSTRUCTIONS can vary.
  An example of such a set can be: CNOT(a, b), CNOT (a, c), CNOT (a, d), CNOT (a, e), I( ), X( ), Z( ), RX(Pi/4), RZ(pi/4), MEASUREMENT( ), ACTIVE RESET( ). Here, a,b,c,d,e are generic indexes used to indicate different OPERATIONs.

Generalising, each qubit requires N PULSES to implement the correspondent N OPERATIONs The exact numbers of qubits covered (Q) is defined by Equation 1 below, where:
a) The maximum size of the memory (M)
b) The amount of data each PULSE requires (D).
c) The precise number of PULSEs (N) per qubit.
d) The number of High-speed converter interfaces physically implemented on the device I).

$$Q=\operatorname{Min}(M/(D*N*2),I)$$

Equation 1: The number of QUBITS (Q) that each device can support is a function of the amount of memory available (M), the maximum amount of data (D) required by each PULSE (multiplied by 2 to account for idle and active pages of the double-buffer memory) and the number (I) of High-Speed Interfaces that can be integrated into the device.

Worked Example current state of the art superconducting quantum computers Q=64.
This originates from:
M=16 GB.
D=300 ns*24 KB/s=7.2 KB.
N=12.
I=1024 pins/(16 pins/channel)=64 channels.

The invention claimed is:

1. An apparatus for a quantum computer, the apparatus comprising:
a memory device and a converter block, the memory device comprising:
a local command module; and
a double-buffer-memory module comprising a plurality of pairs of memory modules, each memory module:
coupled to the local command module; and
configured to store a respective operation for controlling a qubit of the quantum computer;
wherein the local command module is configured to:
receive an instruction to provide the operation for the qubit;
read the operation from a respective one of the plurality of pairs of memory modules indicated by the instruction; and
provide the operation to the converter block; and
wherein the converter block is configured to receive the operation from the memory device and provide digital output pulses, representative of the operation, to an output interface, the output interface configured to provide the digital output pulses to a digital-to-analogue converter for controlling the qubit to perform the operation.

2. The apparatus of claim 1, wherein each pair of memory modules of the plurality of pairs of memory modules comprises a first memory module with an active status and a second memory module with an idle status and the operation is read from the first memory module of the respective pair of memory modules.

3. The apparatus of claim 1, wherein the operation comprises a quantum logic gate with fixed arguments.

4. The apparatus of claim 1, wherein the memory device comprises a local update module configured to:
receive a command to update a respective one of the plurality of pairs of memory modules, the command comprising an updated operation for controlling the qubit, the respective one of the plurality of pairs of memory modules comprising a first memory module with an active status and a second memory module with an idle status; and
write the updated operation to the second memory module.

5. The apparatus of claim 4, wherein the local update module is configured to switch the second memory module to active status and the first memory module to idle status.

6. The apparatus of claim 5, comprising a plurality of memory devices including the memory device and a plurality of converter blocks including the converter block, wherein each memory device is:
coupled to a respective one of the plurality of converter blocks; and
configured to provide a respective operation to the respective converter block.

7. The apparatus of claim 6, wherein each respective converter block, comprises a respective output interface and each respective converter block is configured to provide respective digital output pulses, representative of the respective operation, to the respective output interface, the respective output interface configured to provide the respective digital output pulses to a respective digital-to-analogue converter for controlling a respective qubit, of the quantum computer, to perform the respective operation.

8. The apparatus of claim 7, comprising a global command module, connected to each memory device, and configured to:
receive a request to perform a respective operation on a respective qubit;
identify a particular memory device and particular converter block configured to provide operations to the respective qubit; and
provide an instruction to the particular memory device to access a particular memory module containing the respective operation and provide the respective operation to the particular converter block to control the respective qubit to perform the respective operation.

9. The apparatus of claim 8, comprising a global update module, connected to each memory device, and configured to:
receive a request to perform an update operation on a particular memory module of a particular memory device; and
provide a command to the particular memory device to update the particular memory module using the update operation.

10. The apparatus of claim 9, wherein the global update module is configured to receive signalling from the particular memory device that the update is complete and provide confirmation signalling to control the particular memory device to switch an idle status of the particular memory module to an active status and to switch an active status of a memory module paired with the particular memory module to an idle status.

11. The apparatus of claim 10, further comprising a plurality of digital-to-analogue converters and a corresponding plurality of qubits, each qubit connected to a respective digital-to-analogue converter and each digital-to-analogue converter connected to a respective one of the output interfaces of the plurality of converter blocks.

12. A quantum computer comprising the apparatus of claim 11.

13. A computer-implemented method comprising:
receiving a request to perform a respective operation on a respective qubit of a quantum computer;

identifying a particular memory device and a particular converter block configured to provide operations to the respective qubit;

providing an instruction to the particular memory device to access a particular memory module containing the respective operation and providing the respective operation to the particular converter block to control the respective qubit to perform the respective operation by providing respective digital output pulses representative of the respective operation to a digital-to-analogue converter;

receiving a request to perform an update operation on a particular memory module of a particular memory device;

providing a command to the particular memory device to update the particular memory module using the update operation; and receiving signalling from the particular memory device that the update is complete and providing confirmation signalling to control the particular memory device to switch an idle status of the particular memory module to an active status and to switch an active status of a memory module paired with the particular memory module to an idle status.

14. The method of claim 13, wherein both the respective operation and the update operation are selected from a set of no more than sixteen different operations.

15. A computer program product comprising instructions configured to perform the method of claim 13.

16. A computer program product comprising instructions configured to perform the method of claim 14.

* * * * *